United States Patent
Touchet

(10) Patent No.: US 6,715,013 B1
(45) Date of Patent: Mar. 30, 2004

(54) BUS SYSTEM HAVING IMPROVED CONTROL PROCESS

(75) Inventor: Thierry Touchet, Crolles (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/427,978

(22) Filed: Oct. 26, 1999

(30) Foreign Application Priority Data

Aug. 16, 1999 (EP) .............................................. 99410099

(51) Int. Cl.[7] .......................... G06F 13/00; G06F 1/24; G06F 1/26; G06F 12/00
(52) U.S. Cl. ...................... 710/104; 710/100; 713/100; 713/324; 711/170
(58) Field of Search ................................ 710/100, 104, 710/17, 8, 10, 15, 300–303; 713/1, 2, 100, 324; 711/130, 131, 132, 170, 171, 172

(56) References Cited

U.S. PATENT DOCUMENTS

| 5,237,690 | A | | 8/1993 | Bealkowski et al. | |
|---|---|---|---|---|---|
| 5,550,990 | A | | 8/1996 | Keener et al. | |
| 5,621,678 | A | * | 4/1997 | Barnaby et al. | 365/52 |
| 5,797,032 | A | | 8/1998 | Boccon-Gibbod | |
| 5,870,571 | A | | 2/1999 | Dubureq | |
| 6,055,653 | A | * | 4/2000 | LeBlanc et al. | 714/718 |
| 6,092,146 | A | * | 7/2000 | Dell et al. | 711/5 |
| 6,154,821 | A | * | 11/2000 | Barth et al. | 711/170 |
| 6,240,495 | B1 | * | 5/2001 | Usui | 711/167 |
| 6,260,127 | B1 | * | 7/2001 | Olarig et al. | 711/167 |
| 6,324,651 | B2 | * | 11/2001 | Kubik et al. | 713/323 |
| 6,362,996 | B2 | * | 3/2002 | Chang | 365/52 |
| 6,370,077 | B1 | * | 4/2002 | Koyanagi et al. | 365/230.03 |

* cited by examiner

Primary Examiner—Tim Vo

(57) ABSTRACT

The invention provides a bus system comprising a controller; a high speed data transfer bus, the data transfer bus being subject to one or more inherent physical-layer configuration constraints for proper electrical operation; and a separate control bus. Several devices are connected to the controller through the control bus and the data transfer bus. The controller is arranged to communicate with devices using the control bus in order to verify whether or not one or more of the physical-layer configuration constraints are satisfied. If such configuration constraints are not satisfied, the controller modifies the operation of some of the devices using control signals transmitted on the control bus in order to bring the data transfer bus to an operable condition.

The invention makes it possible to use the bus system, even though physical-layer configuration constraints are violated. The invention applies to Rambus DRAM buses, where devices may be disabled to ensure respect of the constraint on the number of devices.

3 Claims, 2 Drawing Sheets

BUS SYSTEM HAVING IMPROVED CONTROL PROCESS

FIELD OF THE INVENTION

The invention relates to the field of computers, and more specifically to computer buses.

BACKGROUND OF THE INVENTION

Present day computers comprise bus systems, onto which different devices may be plugged. More specifically, a bus system is often comprised of a bus controller and of a bus connected to the memory controller. Different devices may be connected to the bus, so as to be accessed by the bus controller.

One example of such buses is the DRAM bus designed by Rambus Inc. This bus is used for managing high speed DRAM devices. FIG. 1 is a schematic view of the architecture of this type of bus. It shows the memory controller 1, and the Rambus Channel 2. Several Direct Rambus DRAMs or Direct RDRams (trademark) 3–6 are connected to the Rambus Channel. As shown on FIG. 1, the memory controller as well as each of the RDRAMs comprises a Rambus interface 8 for using the bus. The bus 2 is terminated at one end by terminations, and is also connected to a reference voltage Vref as well as to a 400 MHz bus clock.

According to the Rambus specification, there is also provided a power down mode; it is contemplated in the specification that the power down mode is used for reducing power consumption, notably in portable computers.

Rambus products sold on the market are organised in Rambus RIMM (trademark) memory modules, each module supporting 4, 6, 8, 12 or 16 Direct RDRAMs devices. RIMM modules are compatible with standard motherboard form factors; a motherboard usually supports up to three module sockets. The Direct Rambus Channel signals are daisy chained through each module. See Rambus RIMM Module Preliminary Information, document DL0078 available from Rambus Inc.

There is also provided in the Rambus specification a SPD (Serial Presence Detect) device. The purpose of the SPD is to store and provide sufficient information for a system to initialise the memory subsystem correctly: the SPD is a ROM device provided on each RIMM module, which includes information relating to the DRAM timing and device parameters, core organisation, module parameters, and other system level information. The SPD EEPROM devices of each RIMM module conform to the I2C wire protocol, and may be read into or written into by the memory controller of a Rambus system. See Direct Rambus SPD Specification 1.0, available from Rambus Inc.

FIG. 2 is another view of a physical Rambus architecture, this time in an invalid configuration; it shows the memory controller 1 and the Direct Rambus Channel 2. Three modules 10–12 are connected to the bus; each side of each module may have up to 8 RDRAM devices, referenced again 3–6 on FIG. 2. Reference 13 is the SPD EEPROM of module 10; reference 14 shows the I2C protocol bus used by the memory controller for accessing the SPD EEPROMs of the different modules.

More details on Rambus may be found in the corresponding specification, issued by Rambus Inc. under the title Direct Rambus Technology Disclosure, Oct. 15, 1997.

One problem with Rambus is that the load of the bus is limited to 3 modules, and to 32 Direct RDRAM devices; if one of these limitations is violated, the bus system is not designed to be operational, and or even to boot at all; a computer in which the bus system is installed would in this case not be able to boot either.

This limitation on the number of modules is not likely in practice to be violated, since the bus normally comprises at most three module slots, and usually 2 or 3 module slots. However, a module may comprise up to 16 devices, so that the number of devices on the bus may exceed the highest allowable number of devices. This is the case in the configuration shown in FIG. 2.

Thus, the configuration of the bus hardware is such as to enable the bus to be improperly configured; in this case, a physical layer configuration constraint on the bus can be violated, and proper electrical operation of the bus is therefore not ensured. This can prevent the bus as a whole from booting properly. This possibility makes the system difficult for the user to upgrade or to diagnose problems that occur when they try to.

A variety of bus configuration problems have been addressed in other contexts and a variety of solutions proposed.

For instance, U.S. Pat. No. 5,550,990 discusses physical partitioning of logically continuous buses. This document is directed to the SCSI (Small Computer System Interface) bus architecture, and suggests partitioning the bus into two or more physical entities which to the computer appear as one logical entity. This allows addressing problems potentially arising because of the scope of the architecture to be resolved; one example of such problems is excessive signal degradation due to use of signal rates which although allowed by the architecture are inappropriate for a particular bus loading. The solution disclosed in this document is to provide on the bus an adapter; instead of ensuring physical continuity of the bus, the adapter separates the bus into two bus partitions. This makes it possible, e. g. to operate the two partitions of the bus at different speeds, or to increase the number of devices connected to the bus. Where the speed has to be determined, a negotiation between the adapter and the devices connected to the bus is carried out at the time the adapter is initialised.

U.S. Pat. No. 5,870,571 discusses automatic control of data transfer rates over a computer bus; this document is particularly directed to UltraSCSI buses. This document suggests detecting whether a SCSI external device is connected to the bus, and if this is the case, inhibiting the host adapter in order to reduce the data transfer rates to SCSI rate; otherwise, if no external SCSI device is detected, the UltraSCSI rate may be used, and the host adapter is not inhibited. In this document, the adapter polls the devices connected to the bus at initialisation, in order to know the transfer rate at which they may operate. Note that the operation of devices connected to the bus is not modified, since the host adapter only is inhibited.

U.S. Pat. No. 5,237,690 discusses configuration at boot of IBM PS/2 personal computers. These computers provide a POS (programmable option select) for defining or providing settings for the assignment of system resources to a system board and various adapters. In order to avoid having to reconfigure the computer each time an adapter is added, removed or changed, this document suggests testing at boot of the computer whether any adapter was added, removed or changed; if this is the case, the adapters that were altered are disabled, and the computer is operated with all other adapters.

U.S. Pat. No. 5,797,032 discusses a bus for connecting extension cards to a data processing system, and more particularly and ISA or EISA bus. For addressing the problem of collisions between the addresses of the different cards, this document suggests enabling all cards one at a time, for testing the addresses to which they respond. The cards that generate collisions are then disabled, and a message is displayed on a monitor for indicating to the user which cards were disabled.

The configuration constraints with which these two latter documents are concerned are logical-layer constraints and to resolve associated configuration problems the systems described rely on the buses concerned operating correctly at the physical level.

SUMMARY OF THE INVENTION

According to the invention, there is provided a bus system comprising a controller; a high speed data transfer bus, the data transfer bus being subject to one or more inherent physical-layer configuration constraints for proper electrical operation; and a separate control bus, said control bus and said data transfer bus connecting the controller and the, or each, device connected thereto, wherein the controller is arranged to communicate with devices using the control bus in order to verify whether or not one or more of the physical-layer configuration constraints are satisfied and, if such configuration constraints are not satisfied, to modify using control signals transmitted on the control bus the operation of at least some of the devices in order to bring the data transfer bus to an operable condition.

Preferably, if the configuration constraints are not satisfied, the controller is arranged to disable at least some of the devices using control signals transmitted on the control bus in order to bring the data transfer bus to an operable condition. The disabled devices may be the devices furthest from the controller on the data transfer bus. The controller may also be arranged to disable all devices connected to the bus, except one to five devices. The controller may also be arranged to set a stored indicator indicative of a error condition.

In one embodiment of the invention, the physical-layer constraints comprise a constraint on the number of devices connected to the bus.

The invention also provides a computer comprising such a bus.

The invention further relates to a process for bringing a data transfer bus to an operable condition in a bus system comprising a controller; a high speed data transfer bus, the data transfer bus being subject to one or more inherent physical-layer configuration constraints for proper electrical operation; and a separate control bus, said control bus and said data transfer bus connecting the controller and the, or each, device connected thereto. The process comprises the steps of communicating with devices using the control bus in order to verify whether or not one or more of the physical-layer configuration constraints are satisfied and, if such configuration constraints are not satisfied, to modifying the operation of at least some of the devices using control signals transmitted on the control bus.

The step of modifying may comprise disabling at least some of the devices using control signals transmitted on the control bus, and for instance, disabling devices furthest from the controller on the data transfer bus. The step of modifying may also comprises disabling all devices connect the bus, except one to five devices. The process may also comprise, if said configuration constraints are not satisfied, setting a stored indicator indicative of a error condition.

In one embodiment of the process, the physical-layer constraints comprise a constraint on the number of devices connected to the bus.

The invention also provides a computer program product for a computer with a bus system comprising a controller; a high speed data transfer bus, the data transfer bus being subject to one or more inherent physical-layer configuration constraints for proper electrical operation; and a separate control bus, said control bus and said data transfer bus connecting the controller and the, or each, device connected thereto. The computer program product comprises a computer readable medium having thereon:

computer program code means, when said program is loaded, to make the controller communicate with devices using the control bus in order to verify whether or not one or more of the physical-layer configuration constraints are satisfied and, if such configuration constraints are not satisfied, to make the controller modify the operation of at least some of the devices using control signals transmitted on the control bus.

Preferably, if such configuration constraints are not satisfied, the computer program code means make the controller disable at least some of the devices using control signals transmitted on the control bus. The disabled devices may be the devices furthest from the controller on the data transfer bus. The computer program code means may also make the controller disable all devices connected to the bus, except one to five devices. In another embodiment, the computer program code means set a stored indicator indicative of a error condition.

The physical layer constraints may comprise a constraint on the number of devices connected to the bus.

The invention provides a solution to the above described problem. The invention allows a computer at least to boot, even if the bus is improperly configured; this makes it possible to display a message to the user, so that he may address the problem. For Rambus, the mechanical configuration of the bus makes it possible to violate the bus specification by connecting an excessive number of devices on the bus.

In the case of the Rambus system, the limitation in the number of modules and devices connected to the bus is thought to be due to the sensitivity of the high speed signalling used on the Rambus Channel (the RSL or Rambus Signalling Levels) to the number of loads.

In consequence, a number of loads higher than the highest allowable number has no impact on the control bus, and does not affect the RSL signals for a few devices close to the controller. This makes it possible to disable some devices and to allow the bus to operate in a degraded operation mode. This mode is sufficient for booting a computer, and for allowing a warning to be communicated to the user, e. g. by displaying a message, so that they may reduce the number of devices on the bus and fix the problem.

The invention is however not limited to such a problem in the number of devices, but also can be applied in order to resolve other types of improper configuration; for instance, the invention could be applied if the bus can comprise different types of attachable devices, e.g. devices operating at different speeds, or devices requiring a special controller. It could also be applied for solving problems such as the mechanical length of a bus.

BRIEF DESCRIPTION OF THE DRAWINGS

A bus system embodying the invention will now be described, by way of non-limiting example, and in reference to the accompanying drawings, where.

BEST MODE OF CARRYING OUT THE INVENTION

The invention proposes to fix the problem of improper configuration of the bus by detecting an improper configuration, and if such configuration is found, by disabling some of the devices connected to the bus before boot.

In the specific Rambus example, the invention proposes testing the number of devices on the bus, and, if this number is higher than the highest allowable number, by disabling some of the devices connected to the bus before boot. The invention is based on the recognition that even if the number of devices connected to the bus exceeds the highest allowable number, the bus may still operate with only a limited number of devices enabled.

In the case of the Rambus system, the limitation in the number of modules and devices connected to the bus is apparently due to the sensitivity of the high speed signalling used on the Rambus Channel (the RSL or Rambus Signalling Levels) to the number of loads; the inventors of the present application have realised that a number of loads higher than the highest allowable number has no impact on the control bus, and does not affect the RSL signals for a few devices close to the controller. This makes it possible to disable some devices and to allow the bus to operate in a degraded operation mode. This mode is sufficient for booting a computer, and for allowing a warning to the user, e. g. by displaying a message.

Figure 1:
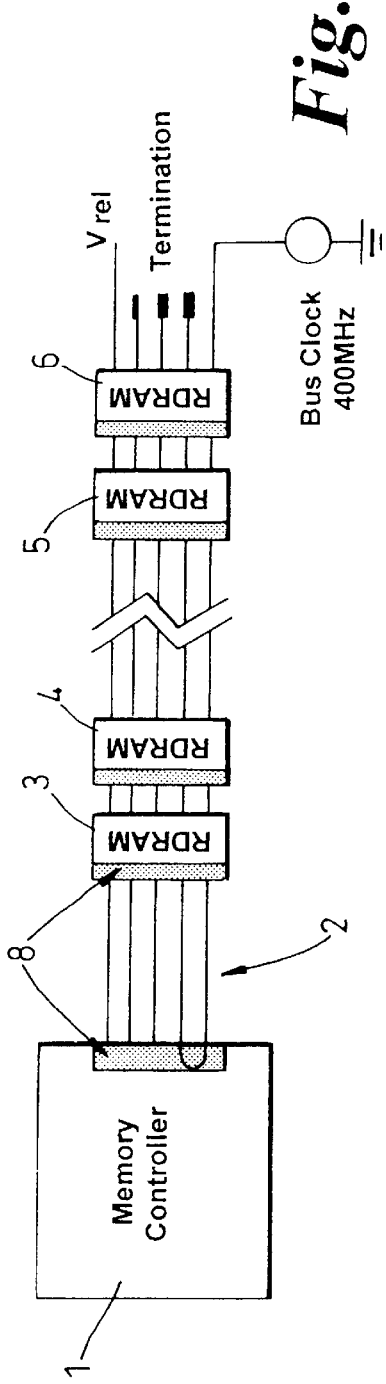
FIG. 1 is a schematic view of the architecture of a bus system of the Rambus type.
Figure 2:
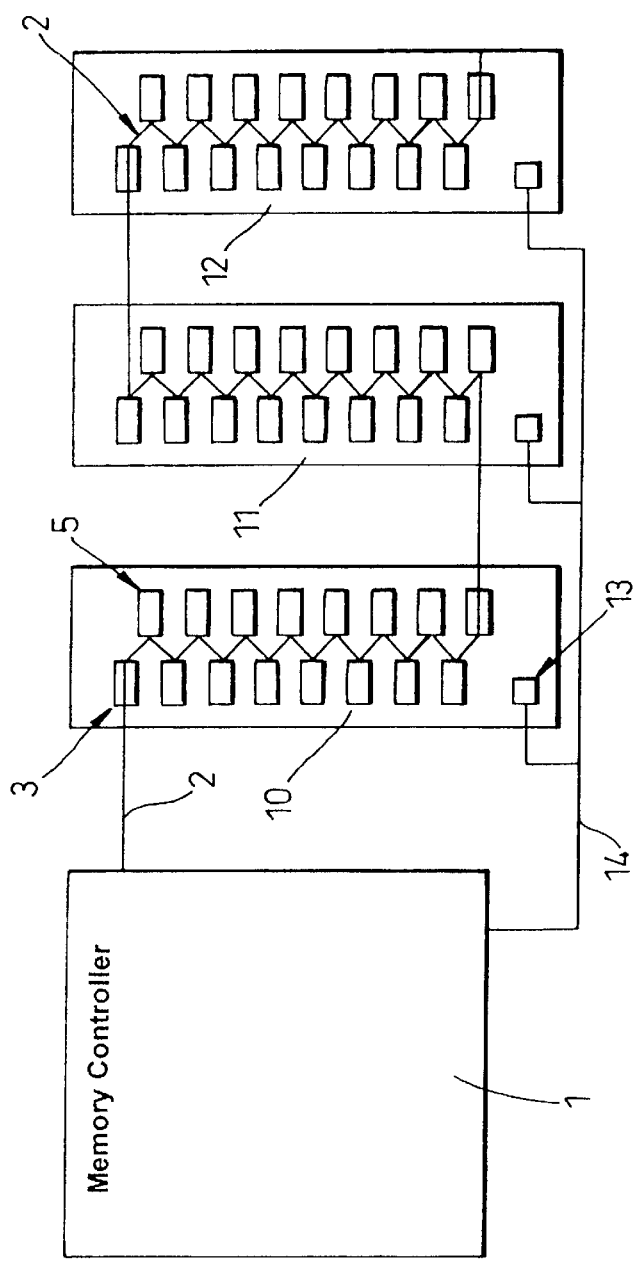
FIG. 2 is another view of the Rambus physical architecture in an invalid configuration.
Figure 3:
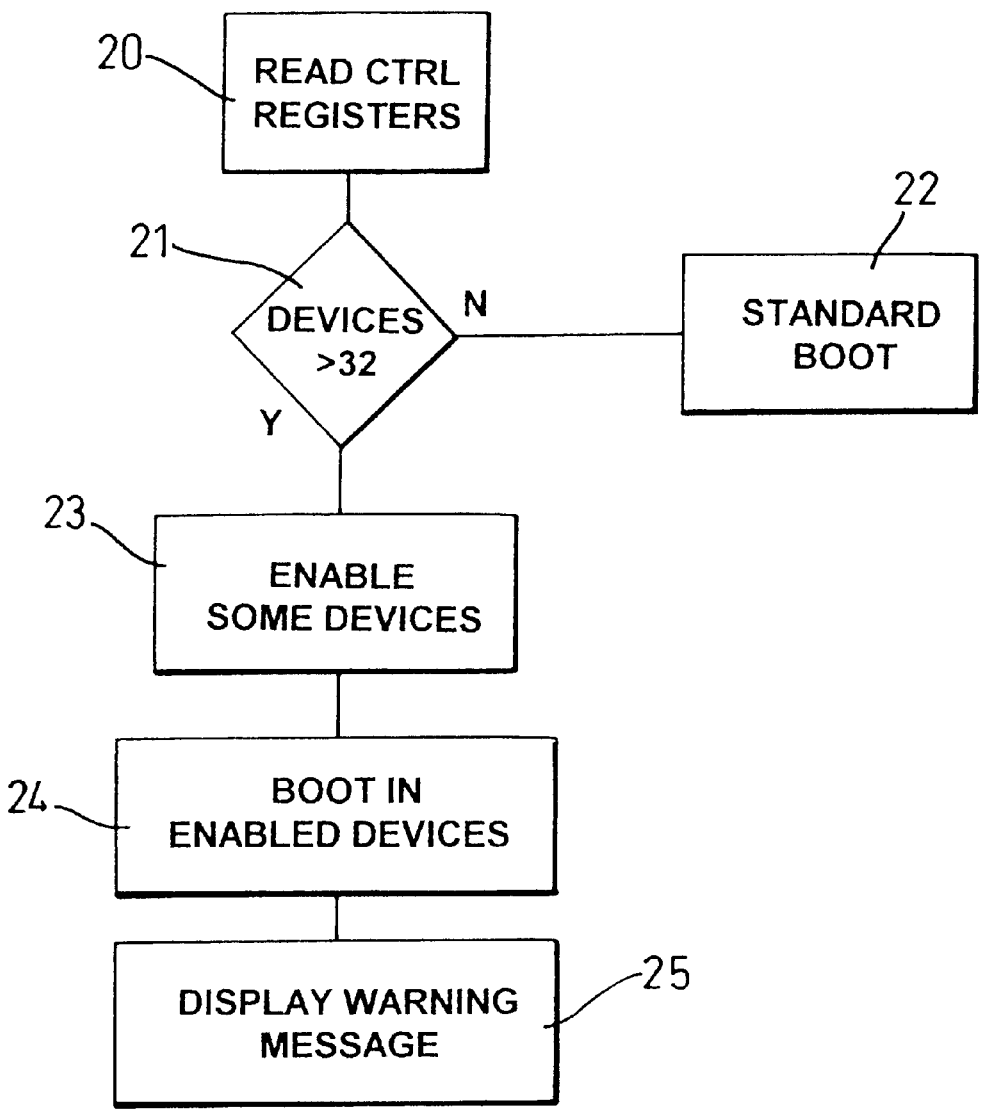
FIG. 3 is a flowchart of a bus control process according to the invention.

FIG. 3 is a flowchart of a bus control process according to the invention. The process of claim 1 is preferably carried out at the time the bus system is started. In the case of a personal computer, the process of the invention would be carried out in the BIOS of the computer, at the time of computer boot; the necessary computer code would be contained in the relevant memory. In the embodiment of FIG. 3, the operation of the process of the invention is described in reference to the limitation of the number of devices; the invention also applies similarly to the limitation of the number of modules.

At step 20, which is the first step of the process, the controller 1 reads the control registers of all the devices connected to the bus. In the Rambus, this is made possible by the I2C bus, that accesses the control register even when the number of devices connected to the bus is higher than the highest allowable number. The controller 1 then knows the number of devices connected to the bus channel.

At step 21, the number of devices connected to the bus channel is compared with the highest allowable number for the channel—in the case of Rambus, 32 devices. If the number of devices is lower than the highest allowable number, or equals this number, the process passes to step 22. Else, if the number of devices is higher than the highest allowable number, the process passes to step 22.

At step 22, it is ascertained that the number of devices connected to the bus complies with the specification, and the process according to the invention is over. The bus is ready for standard operation, and the operation for which the bus is intended may be carried out. In the case of a computer, standard initialisation and boot process may take place.

At step 23, it is ascertained that the number of devices connected to the bus violates the bus specification; the controller then enables only some of the devices. This is done with the help of the I2C bus.

The number of devices to be disabled or enabled depends on the specification, and on the total number of devices on the bus. For Rambus, all devices but a limited number are preferably disabled. A number of enabled devices of two has proved appropriate.

More generally, at this step, the controller may enable from one to five RDRAMs. Enabling one device allows operation of the bus in a degraded mode, and would provide sufficient memory for displaying a message to the user; in other words, one device would be sufficient for copying a warning message to the video control for display on the computer screen. The upper limit on the number of enabled devices depends on the operation of the bus; an upper limit of five devices is appropriate for Rambus, and allows the bus to operate properly. Correct operation of the bus becomes less likely as the number of devices increases.

Preferably, the enabled devices are the devices adjacent to the controller on the bus channel, so that operation of the bus is possible, even though the number of devices is higher than the highest allowable number of devices. Enabling the devices adjacent to the controller increases the chances that the bus will operate, despite the fact that the number of devices exceeds the highest allowable number. Indeed, the timing constraints are more likely to be satisfied. It is however possible to enable, e. g. the second hand third devices, without enabling the first one.

It is also advantageous to set the parameters of the enabled devices, so as to improve their operation. For Rambus, this may be done by writing in the control registers of the enabled devices, so that these devices work in the same time domain and have optimised timing parameters.

Thus, at this step, the controller enables some of the devices. The number of enabled devices, and their location are chosen so that the bus operates properly, despite the excessive number of devises. The proper operation of the bus may easily be verified, e.g. by accessing the devices.

After step 23, a limited number of devices are enabled, and the bus is ready for operation in a degraded mode. The rest of the process depends on the environment where the bus is used; typically, the machine using the bus may start in a degraded mode, e. g. for warning the user. Steps 24 and 25 are exemplary of the case where the bus is used in a computer. After step 23, the process passes to step 24; the computer starts booting using the enabled devices only. The process then passes to step 25; at ti,is step, a message is displayed to the user, by any available means—for instance by displaying a message on the screen, setting a flag, or turning on a LED or an acoustic signal. The message may suggest a way to fix the problem, and may suggest removing one of the modules so as to reduce the number of modules.

The process then passes to step 25. At step 25, the machine is made ready for shut down and reboot.

The process of the invention makes it possible to use the bus, in a degraded mode, even when a limitation on the number of devices is violated.

The description of the preferred embodiment of the invention was made in reference to the Rambus specification. However the invention also applies to other types of bus systems, where there is provided a controller, a bus, and where the controller may enable or disable devices plugged on the bus, so as to ensure that a physical-layer constraints is respected. For Rambus, the physical layer constraints is assessed as a number of devices. The invention could also apply to other types of physical layer constraints.

In the Rambus embodiment of the invention, the controller assesses the number of devices, by reading the control register of the modules. The invention also applies to the case where control registers are provided on each device, and not on each module.

What is claimed is:

1. A bus system comprising:
   a controller;
   a high speed data transfer bus, the data transfer bus being subject to one or more inherent physical-layer configuration constraints for proper electrical operation;
   a separate control bus, said control bus and said data transfer bus connecting the controller and the, or each, device connected thereto, wherein the controller is arranged to communicate with devices using the control bus in order to verify whether or not one or more of the physical-layer configuration constraints are satisfied and, if such configuration constraints are not satisfied, to modify using control signals transmitted on the control bus the operation of at least some of the devices in order to bring the data transfer bus to an operable condition;
   wherein if said configuration constraints are not satisfied, the controller is arranged to disable at least some of the devices using control signals transmitted on the control bus in order to bring the data transfer bus to an operable condition; and
   wherein the controller is arranged to disable all devices connected to the bus, except one to five devices.

2. In a bus system, comprising:
   a controller;
   a high speed data transfer bus, the data transfer bus being subject to one or more inherent physical-layer configuration constraints for proper electrical operation; and
   a separate control bus, said control bus and said data transfer bus connecting the controller and the, or each, device connected thereto,
   a process for bringing the data transfer bus to an operable condition, comprising the steps of
      communicating with devices using the control bus in order to verify whether or not one or more of the physical-layer configuration constraints are satisfied and,
      if such configuration constraints are not satisfied, to modifying the operation of at least some of the devices using control signals transmitted on the control bus;
   wherein said step of modifying comprises disabling at least some of the devices using control signals transmitted on the control bus; and
   wherein said step of modifying comprises disabling all devices connected to the bus, except one to five devices.

3. A computer program product for a computer with a bus system, comprising:
   a controller;
   a high speed data transfer bus, the data transfer bus being subject to one or more inherent physical-layer configuration constraints for proper electrical operation; and
   a separate control bus, said control bus and said data transfer bus connecting the controller and the, or each, device connected thereto,
   said computer program product comprising a computer readable medium having thereon
      computer program code means, when said program is loaded, to make the controller communicate with devices using the control bus in order to verify whether or not one or more of the physical-layer configuration constraints are satisfied and,
      if such configuration constraints are not satisfied, to make the controller modify the operation of at least some of the devices using control signals transmitted on the control bus;
   wherein, if such configuration constraints are not satisfied, the computer program code means make the controller disable at least some of the devices using control signals transmitted on the control bus; and
   wherein, if such configuration constraints are not satisfied, the computer program code means make the controller disable all devices connected to the bus, except one to five devices.

* * * * *